United States Patent
Pilling et al.

(10) Patent No.: US 7,540,476 B2
(45) Date of Patent: Jun. 2, 2009

(54) VALVE FOR A CONTACT TRAY

(75) Inventors: Mark W. Pilling, Jenks, OK (US); Dale Edward Nutter, Peralta, NM (US)

(73) Assignee: Sulzer Chemtech AG, Winterthur (CH)

( * ) Notice: Subject to any disclaimer, the term of this patent is extended or adjusted under 35 U.S.C. 154(b) by 552 days.

(21) Appl. No.: 11/488,531

(22) Filed: Jul. 18, 2006

(65) Prior Publication Data

US 2008/0018003 A1    Jan. 24, 2008

(51) Int. Cl.
*B01F 3/04* (2006.01)
(52) U.S. Cl. .................................. 261/114.4
(58) Field of Classification Search ................. 261/113, 261/114.2, 114.3, 114.4, 114.5
See application file for complete search history.

(56) References Cited

U.S. PATENT DOCUMENTS

| 2,443,812 | A | * | 6/1948 | Ackroyd | ................. 261/114.2 |
| 3,025,041 | A | | 3/1962 | Sandler | |
| 3,770,255 | A | | 11/1973 | Nutter | |
| 4,382,901 | A | * | 5/1983 | Thomas | .................... 261/114.2 |
| 6,145,816 | A | | 11/2000 | Chuang | |
| 6,270,062 | B1 | | 8/2001 | Chuang | |
| 2007/0227595 | A1 | | 10/2007 | Zhang | |

FOREIGN PATENT DOCUMENTS

| WO | WO 99/19054 | 4/1999 |
| WO | WO 00/24489 | 5/2000 |
| WO | WO 2006/007783 | 1/2006 |

* cited by examiner

*Primary Examiner*—Scott Bushey
(74) *Attorney, Agent, or Firm*—Francis C. Hand; Carella, Byrne, Bain et al.

(57) ABSTRACT

The valve for a contract tray employs an aperture in a deck that is of rectangular or trapezoidal shape with upstanding walls at the sides of the aperture. The valve body is disposed in the aperture with a cover above the aperture and legs that extend downwardly to interfit with at least the upstream end of the walls to block the liquid flow. The valve body may be fixed or movable. In the movable embodiment, the valve body is seated on the walls about the aperture to close the aperture. The ascending vapor lifts the valve to allow bubbling of the vapor in the liquid on the deck.

24 Claims, 3 Drawing Sheets

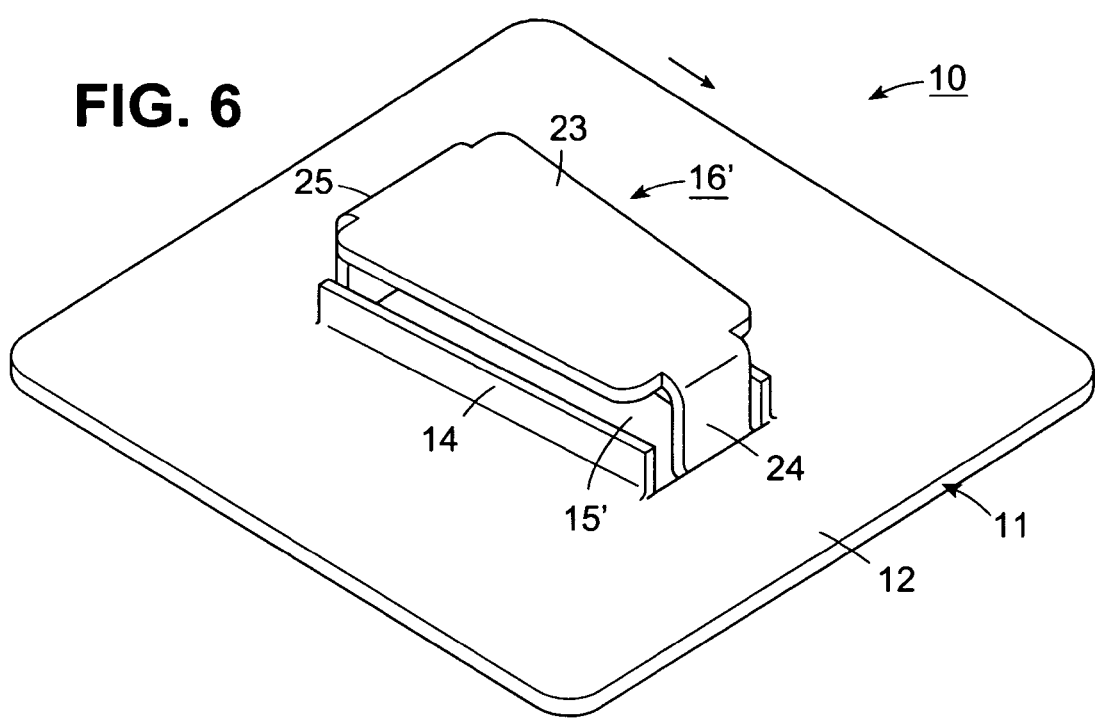
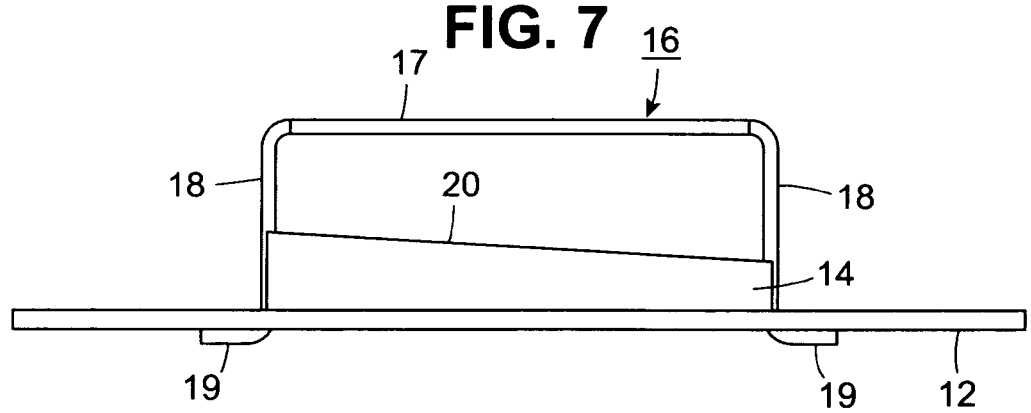
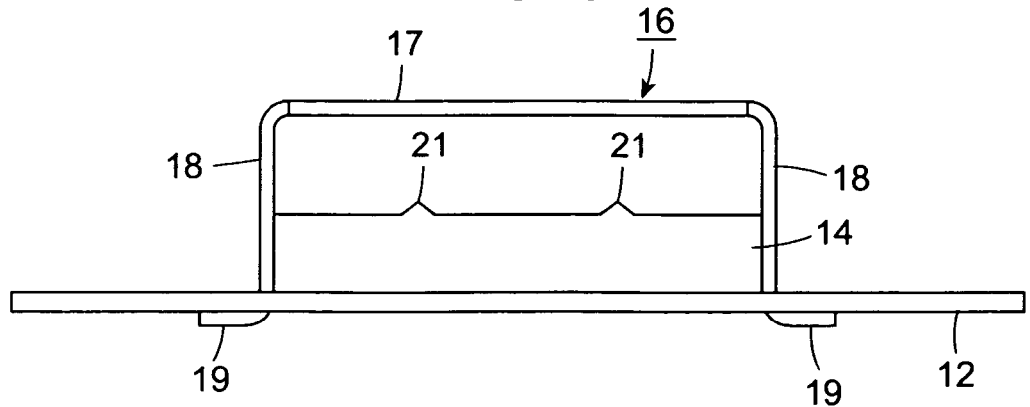

VALVE FOR A CONTACT TRAY

This invention relates to a valve for a contact tray. More particularly, this invention relates to a valve for a vapor-liquid contact tray for use in a distillation column.

As is known, distillation columns have been provided with various types of contact trays for vapor-liquid contact purposes. Examples of such columns are described in U.S. Pat. Nos. 4,750,975; 5,120,474 and 5,453,222.

Typically, the contact trays in a distillation column and the like have decks over which a flow of liquid passes. In some cases, the decks are made with valves through which an ascending vapor may flow and over which a liquid may flow in order to bubble the vapor through the liquid. In other cases, a sieve tray is employed that simply has holes in the deck with no valves whatsoever. The sieve trays are popular because they are simple and inexpensive but they do not have as extensive of an operating range as a valve tray.

The valves that have been employed have been of various constructions, such as described in U.S. Pat. Nos. 3,770,255; 5,120,474; 5,453,222 and 5,911,922. In each of these cases, the valves basically provide a cover that is disposed over an aperture in the deck and a pair of legs that slidably guide the cover between a closed position on the aperture and a raised position relative to the aperture in dependence upon the ascending flow of vapor. In these cases, once the valve cover begins to lift from the deck of the tray, the ascending vapor is able to escape laterally from under the cover. In addition, the liquid is able to flow directly into the aperture. Optimally, the operation of such tray construction should be such that the vapor and liquid flows reach a level of stability. That is to say, the ascending vapor should be under a sufficient pressure to prevent or minimize the amount of liquid that flows through the same apertures.

Accordingly, it is an object of the invention to provide an improved valve for a contact tray.

It is another object of the invention to improve the efficiency of contacting an ascending vapor with a liquid in a distillation column.

It is another object of the invention to improve the efficiency of a contact tray in a distillation column.

It is another object of the invention to improve the capacity of a contract tray by lowering the pressure drop.

Briefly, the invention provides an infusion valve that has at least one pair of upstanding walls astride an aperture in a deck of a contact tray for an ascending flow of vapor and a valve body that is disposed in the aperture. The valve body has a cover spaced above the walls defining the aperture and at least a pair of legs that extend from the cover through the aperture.

The valve body may be stationary or movable for movement from a closed position supported on the walls to a raised position above the walls under the influence of an ascending flow of vapor. When of the movable top type, each leg of the valve body is provided with a foot at a lower end for abutting an underside of the deck in the raised position.

The valve is particularly useful for a mass transfer column and is incorporated in a contact tray having a deck over which a liquid is passed.

In order to form an aperture for the ascending vapor, the deck is cut with a straight cut and two transverse cuts at the end of the straight cut. The resulting flaps are then bent upward at approximate 90° angles to form an aperture of rectangular shape and walls that run the length of the aperture along each side. The maximum height of the walls would be one-half of the base width since they are constructed from the deck material that was inside the rectangular zone. Alternatively, the walls may be less than half of the valve width to control the seated valve elevation for different process applications.

The moving or floating valve body is then inserted in the rectangular aperture in a similar fashion to what is done with conventional Nutter B type valves. The advantage of this construction is that an orifice results from the valve being elevated off the tray deck by the height of the walls on the side of the rectangle. The legs (ends) of the valve block the ends of the rectangular aperture. The resulting elevated valve will flow vapor more easily since the resulting head pressure from the liquid on the tray deck will be less than that seen by the other conventional valves or orifices located at the deck elevation.

The result is a raised valve that will function as a combination low pressure drop valve (as a venturi type) and a froth promoter. These valves may be used as either the first row of valves on center and off-center downcomers for multipass trays or could be used on the entire tray for a low pressure drop device. A generally standard practice for valve tray design is to use a combination of light and heavy valves on a single tray deck in order to tailor how the valves open up at lower vapor rates. Typically 25-50% of the valves will be of lower thickness so they will lift earlier than the heavier valves. This is done to give better efficiency at lower rates. However, in some cases, specifications prevent the use of the light valves for corrosion purposes. The valves of the invention could be used in place of the light valves to avoid this conflict.

The aperture in the deck may be other than rectangular and the valve body may be shaped to cooperate with the aperture. For example, the aperture may be trapezoidal, circular, elliptical or polygonal so long as a pair of upstanding walls are provided on opposite sides of the opening. Further, a plurality of upstanding walls may be disposed about an aperture while the valve body is provided with a plurality of legs that depend from the cover to interfit in alternating manner with the upstanding walls to form a seal to the liquid on the deck.

When used with a downcomer, the valve with the raised rectangular ends break the momentum of the flow of liquid leaving the downcomer and the raised lower pressure drop orifice will inject vapor more effectively into that liquid. This valve may be used underneath a truncated downcomer to condition the liquid flow and inject vapor while the liquid is still underneath the downcomer. The valve can function in a similar manner to a froth promoter and can be placed much closer to a truncated downcomer without the risk of liquid penetration. Historically, conventional valves used near a downcomer discharge have problems with fast moving unaerated liquid being forced into the valves due to the liquid momentum being greater than that of the vapor stream coming from below. The valves provided by the invention are completely blocked on the upstream side and are blocked at the deck level on the side portions. This is also important since liquid coming from a downcomer may approach the valve obliquely and can penetrate the valve from the sides as well. Penetration leads to lower tray efficiency and lower capacity since the liquid traveling through the valve occupies space that is intended for vapor flow. In this respect, liquid penetrating the inlet side of a tray misses contact with vapor on that tray and the tray below since the liquid falls onto the outlet of the tray below. Therefore, liquid penetration has a very significant adverse affect on efficiency.

The invention provides a valve that would increase the operating range of the tray. Trays with different size/shape orifices often have problems at turndown conditions because the different orifices have different orifice coefficients so that one orifice will weep preferentially. With this valve, the movable valve body will close to prevent any possible weeping and effectively lower the deck open area to delay weeping with the other orifices.

This valve can also be effectively used with truncated downcomer trays where liquid falls from a downcomer orifice onto a deck below. Typically, truncated downcomers are forced to deposit liquid to a non-perforated region of a tray deck to ensure that there is no liquid penetration. Some designers have tried baffles of sorts to break the falling liquid momentum with only limited success. This valve would likely not be used directly beneath a downcomer liquid spout but in very close proximity. The valve can well withstand the chaotic flow patterns beneath a downcomer without suffering weeping or penetration whereas other conventional devices cannot.

The valve will enhance the performance of the tray with respect to efficiency, capacity, and turndown (operability). Since the valves will allow immediate mixing and generation of interfacial area between the vapor and liquid streams, the efficiency will be enhanced. Capacity will be improved since the valve will ensure that vapor is flowing through all available orifices, thus equalizing the froth height above the tray deck, reducing the pressure drop, and the orifice shape will reduce the pressure drop as well. This will help plant pressure drop constraints and operating costs and will also decrease the downcomer backup loading of the trays, giving additional liquid handling capabilities.

The ability of these valves to close improves tray turndown, especially when used in conjunction with a moving valve tray. Resultingly, a tray using infusion valves and conventional moving valves can achieve turndowns in excess of 4:1 whereas a conventional sieve tray typically achieves a turndown limited to 2:1.

The valve has the ability to close at low vapor rates. This allows the valve to be used uniformly over an entire tray deck or only on the inlet side of the tray. When in the closed position, the lower profile of the valve also allows some disruption of the clear liquid flow to promote froth on the tray deck without creating a substantial liquid gradient across the tray. The movement feature will allow for a greater operating range than with froth promoters. The rounded opening in the tray deck makes the valve a lower pressure drop device than a conventional froth promoter.

The simple construction of the valve allows for fast installation.

Another substantial advantage will be the ability to maintain the tray efficiency at low vapor rates. Trays with a substantial amount of open area at the inlet side of the tray deck have generally shown poor performance at low loadings. This is because too much vapor comes from the inlet side of the tray. This leads either to the vapor blowing the liquid across the tray or to only one mixing zone on the tray where no "flow path length" effect can be gained. The net result is only achieving a point efficiency on the tray rather than a higher efficiency bonus from a continuous injection of vapor along the entire flow path length. This difference is often at least 10-15% and can be as much as 25-30%.

The valve will allow better turndown than a venturi valve since the valve will lift earlier because of the raised orifice and block out liquid because of the side walls.

Another particular benefit is that the valve can withstand a strong liquid current at deck level that often forces liquid downward through the valve. Therefore, this valve is ideal for being placed in these high momentum areas, such as the inlet side of the tray immediately downstream of the liquid inlet, underneath truncated downcomers, and downstream of baffles or directional vapor valves that direct the liquid flow obliquely to the infusion valve orientation. This valve can be used downstream of any redirecting device and will not allow penetration.

The valve can also be used at the outlet side of the tray where the liquid converges toward the tray centerline due to the round column shape. These areas often have weeping valves due to the oblique flow of the liquid in reference to the valve orientation.

Since the valve is closed on the upstream side, the valve would be more effective at preventing liquid from forcing its way into the valve.

Often round valve trays use a kind of inlet weir to keep liquid from penetrating the first row of valves on the tray. This weir is sometimes continuous and can cause the accumulation of fouling material on the upstream side of the weir. The valves of the invention act as an alternating barrier that will break momentum but can also allow the passage of fouling materials between the valves so as not to accumulate this material.

These and other objects and advantages of the invention will become more apparent from the following detailed description taken in conjunction with the accompanying drawings wherein:

FIG. 6 illustrates a view of a modified valve employing a trapezoidal aperture in accordance with the invention;

FIG. 7 illustrates a side view of the valve of FIG. 1 employing a wall with an angled upper edge in accordance with the invention; and FIG. 8 illustrates a view similar to FIG. 7 of a wall having a plurality of projections in an upper edge in accordance with the invention.

Figure 1:
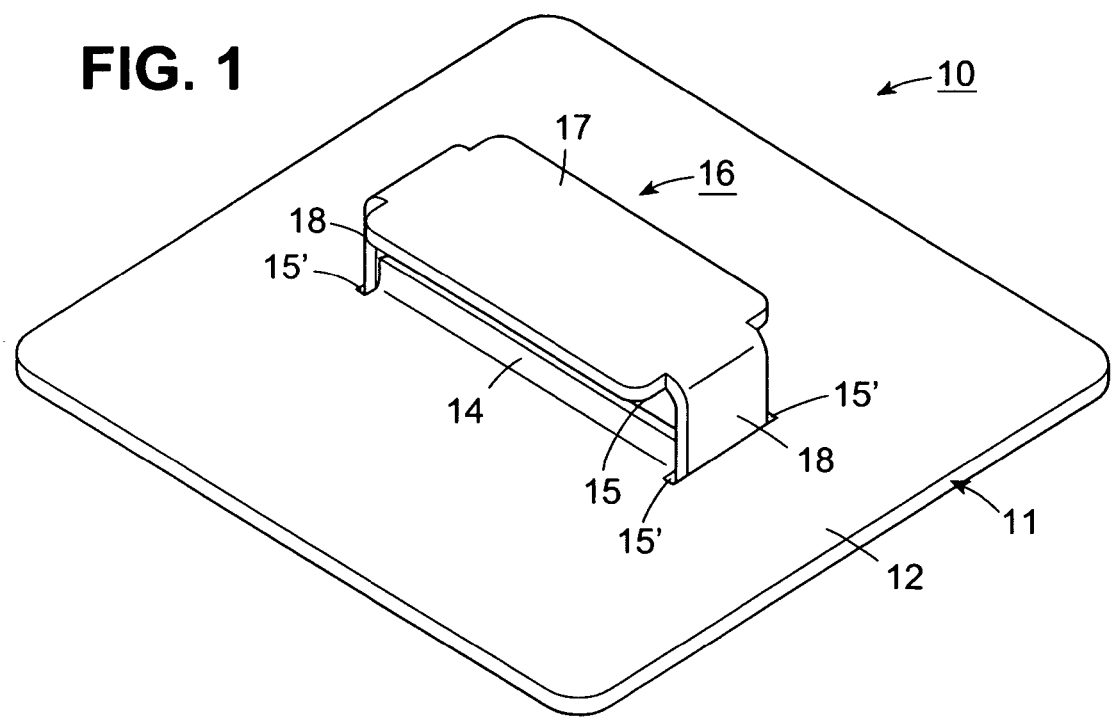
FIG. 1 illustrates a perspective view of an infusion valve constructed in accordance with the invention.

Referring to FIG. 1, the infusion valve 10 is particularly useful in a contract tray 11, for example, for use in a distillation column employing a downcomer. The valve 10 may be of a fixed type or of a movable (floating) type. FIG. 1 illustrates a valve 10 of a movable type.

As illustrated, the contact tray 11 has a deck 12 for receiving a flow of liquid thereon and a plurality of valves 10 (only one of which is shown) which are located in the deck 12 in rows with adjacent rows being disposed in a staggered array, e.g. with a triangular pitch, or in a regular array, e.g. with a square pitch. Each valve 10 has a pair of parallel opposed walls 14 that extend upwardly from the deck 12 to define an aperture 15 in the deck 12 of rectangular shape for an ascending flow of vapor as well as a one-piece valve body 16 that is disposed in the aperture 15 for movement from a closed position on the walls 14 to a raised position (as shown) above the walls 14 under the influence of the ascending flow of vapor.

Preferably, each wall 14 is integral with the deck 12 and is of a height equal to one-half the width of the aperture 15.

Advantageously, the vertical walls 14 on the sides of the deck apertures 15 provide rounded edges to the vapor flow through the deck 12 thereby lowering the vapor pressure drop. Additionally, the sharp edges at the tops of the walls 14 impede the liquid that tends to flow obliquely into the deck apertures 15. Of note, the height of the walls 14 may be minimized to produce only these deck edge orifice effects, otherwise liquid can flow on the deck up to the depth of the walls 14 without being infused by the vapor.

Alternatively, the walls 14 may be formed with an outward bend to shorten the wall without cutting the wall 14 in order to prevent liquid penetration.

Figure 3:
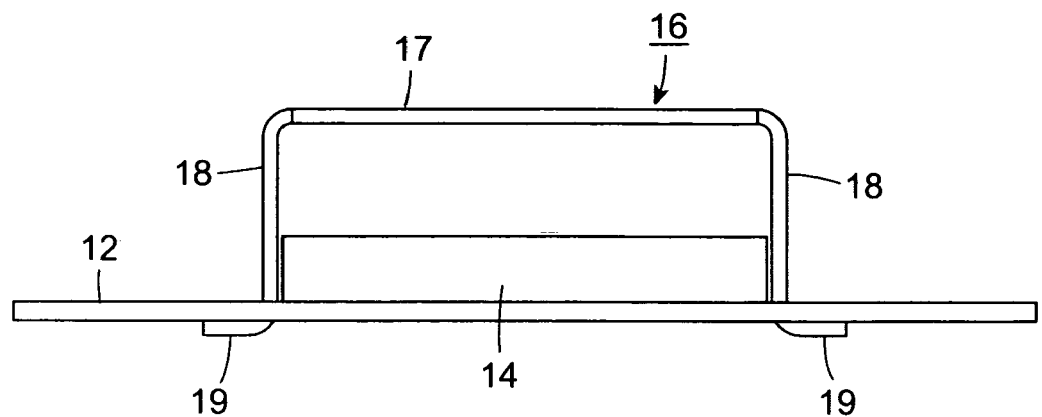
FIG. 3 illustrates a side view of the valve of FIG. 1.

The valve body 16 has a cover 17 of flat rectangular shape for resting on the walls 14 in the closed position and a pair of legs 18 extending from opposite ends of the cover 17 through the aperture 15. Each leg 18 also has a foot 19 at a lower end for abutting an underside of the deck 12 in the raised position (see FIGS. 3 and 4).

Figure 2:
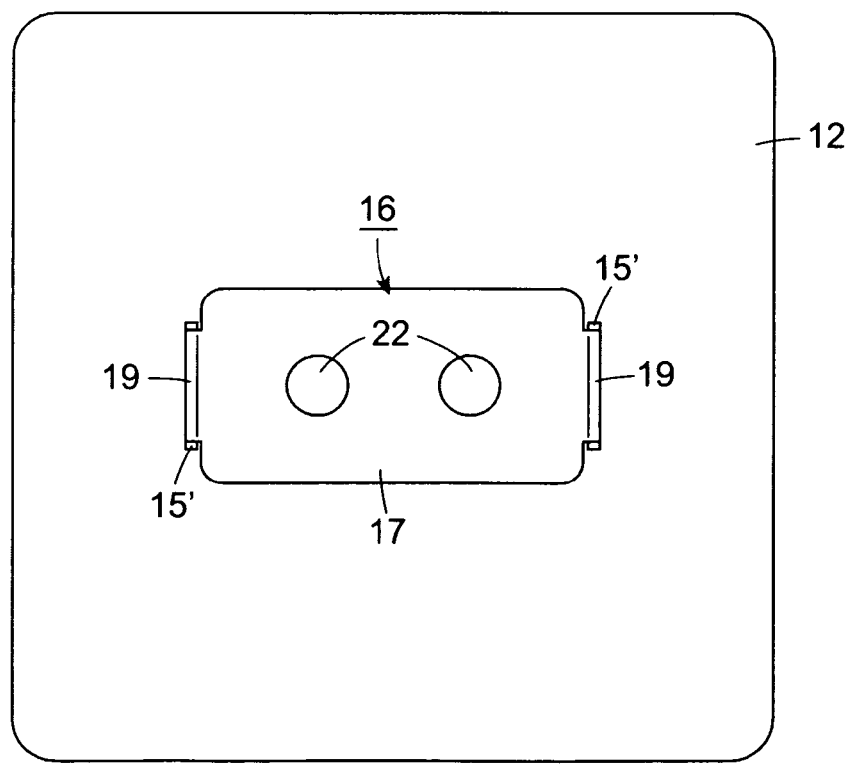
FIG. 2 illustrates a plan view of the valve of FIG. 1.
Figure 4:
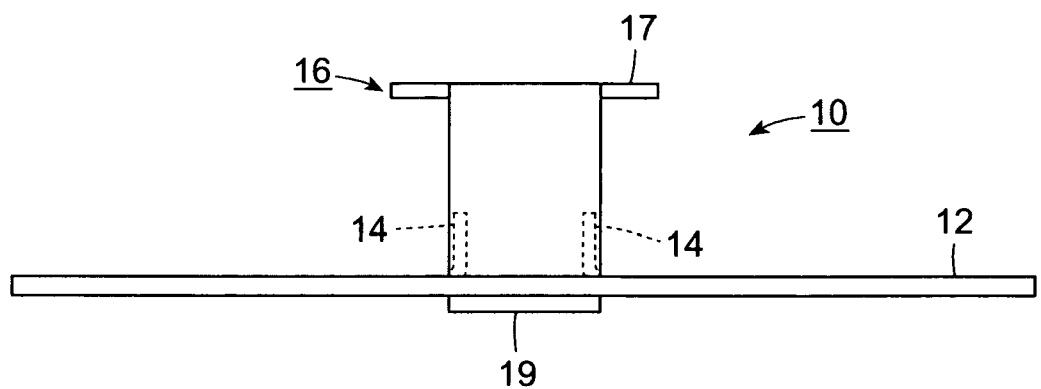
FIG. 4 illustrates an end view of the valve of FIG. 1.

As illustrated in FIGS. 1 and 2, the cover 17 is of a length less than or equal to the length of a wall 14. In addition, as shown in FIG. 4, the cover 17 extends laterally outwardly of the plane of the walls 14.

Figure 5:
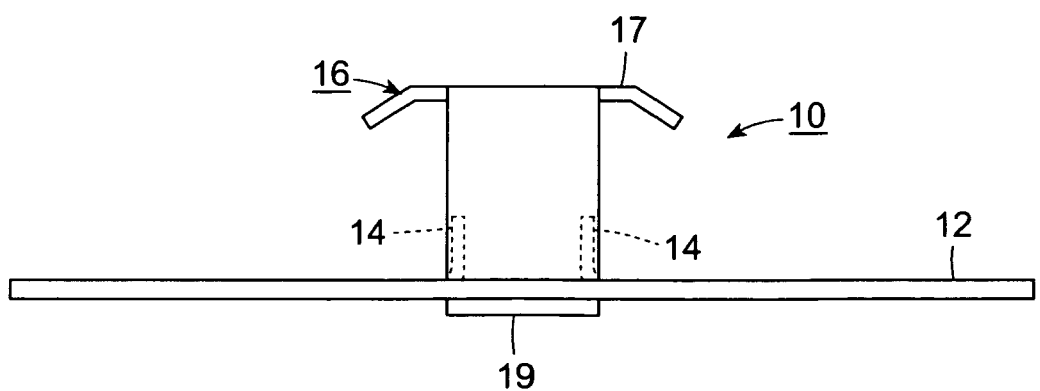
FIG. 5 illustrates a front view of a modified valve constructed in accordance with the invention.

Alternatively, as illustrated in FIG. 5, wherein like reference characters indicate like parts as above, the cover 17 may be bent downwardly at opposite sides to deflect an ascending flow of vapor into the liquid on the deck 12. This reduces the risk that liquid can pass between raised valves 10 without vapor/liquid contact.

The walls 14 may be bent into a semi-circular C shape rather than being bent at a ninety degree angle. This would give a rounded opening between the top of the wall 14 and the bottom of the valve cover 17 and would allow control of the wall height and also make the outer edge of the wall 14 less conducive for liquid to travel up the wall 14 and into the valve aperture 15.

Also, each leg 18 of the valve body 16 is of a height twice the height of a respective wall 14 and yields an open area from the resulting gap that would be the same as the aperture in the deck. However, the length of the legs 18 may vary to control the open area of each valve.

In the illustrated embodiment, slots 15' are cut in the deck 12 on both ends of the aperture 15 to allow a leg 18 that is wider than the main aperture 15 to travel through the deck 12 and to act as a momentum breaker. For example, if the aperture 15 is cut 2"×2" in the deck 12, the upstream leg 18 may be made 3" wide to block more liquid. In order to do this, the slot 15' would be cut in the deck 12 to extend ½" on either side of the aperture 15 to accommodate this leg passing though the deck 12 as the valve body 16 lifted and closed. Further, the extended slots 15' need not be parallel with the existing leg 18 in order to divert liquid or vapor.

Where the deck 12 is not provided with the slots 15', each leg 8 is made of a width to interfit between the walls 14 and to present a barrier to the liquid flow passing across the deck 12. Where the deck 12 is provided with the slots 15', each leg 18 may be made wider than the aperture 15 so as to overlap the walls 14.

When in use, the valve body 16 is seated on the upper edges of the walls 14 while a flow of liquid flows about the upstream leg 18 of the valve body 16 and the upstanding walls 14. With the legs 18 of the valve body 16 disposed in interfitting relation or in overlapping relation with the walls 14 about the aperture 15, a seal is provided to the liquid so that little or no liquid will leak through the aperture 15.

When the pressure of the ascending vapor becomes sufficient, the valve body 16 is raised off the walls 14 to create an orifice through which the ascending vapor may flow in order to bubble through the liquid that is flowing over the deck 12. The elevated orifice will flow the vapor easily since the resulting head pressure from the fluid on the tray deck 12 will be less than that by other valves or orifices that may be located at the deck elevation.

Referring to FIG. 6, wherein like reference characters indicate like parts as above, the aperture 15' of the valve 24 in the deck 12 may be trapezoidal in shape and the valve body 16' may be of a compatible shape. In the illustrated embodiment, the valve body 16' has a cover 23 of trapezoidal shape, a narrow leg 24 at one end on the downstream side of the aperture 15' relative to the flow of liquid indicated by the arrow and a wide leg 25 at the opposite upstream end. In this embodiment, the liquid flow is diverted about the valve 15' at the upstream end while the narrower downstream end of the valve 15' is open for flow.

In another embodiment, the legs 24, 25 may be of equal width, in which case the downstream leg 24 of the valve 16' is disposed in interfitting relation with the walls 14 at the downstream side while the upstream leg 25 is disposed in laterally spaced relation to the walls 14 at the upstream side.

Where the wide leg 25 is disposed on the upstream side relative to the flow of liquid, as illustrated, this would block more of the liquid while allowing the downstream leg 24 and parts of the sides to be open for "pushing". In this respect, the liquid flows across the tray from the outlet of one downcomer (from the tray above) to the inlet of the next downcomer. Since towers are round, the liquid from a side downcomer tends to focus towards the centerline giving uneven flow. Accordingly, directional vapor valves have been used that use vapor momentum to impart directional flow on the liquid in order to push the liquid across the deck in whatever direction the designer wishes. Usually, the pushing is towards the outlet weir and away from the liquid flow centerline.

Also, the walls 14 may be of rectangular shape as shown or of trapezoidal shape with an angled upper edge as shown in FIG. 7 since the walls 14 are cut from the aperture 15'. Where desired, the walls 14 can trimmed to be trapezoidal either in or opposite to the principal direction of liquid flow.

Where the valve body 16' has legs 24, 25 of different widths and assuming the legs are the same length, the wider leg 25 will weigh more than the more narrow leg 24. This makes the valve body 16' unbalanced and the valve body 16' will tend to open tilted rather than with the cover 23 of the valve body 16' being horizontal. If the wide leg 25 is perforated, the weight of the leg 25 is less and this makes the valve body 16' more balanced.

Also, the trapezoidal aperture 15' may be disposed with the bases perpendicular to the direction of flow of the liquid.

Where the trapezoidal walls are taller at the upstream end of the valve, as illustrated, there will be less liquid head above the vapor flow aperture 15 at the upstream end which will tend to offset the weight effect of the wider upstream leg and end of the valve. In this case, the wall at the downstream end should be the minimum practical height for manufacture to assure maximum vapor infusion.

Where the trapezoidal walls are taller at the downstream end of the valve, there will be less liquid head above the downstream end. When combined with the lower weight of the narrower leg and end, these features will both tend to encourage preferential downstream valve opening. In this case, the wall height at the upstream end should be the minimum practical to manufacture to assure maximum vapor infusion.

Referring to FIG. 7, each wall 14 may be provided with an upper edge 20 that is disposed at an angle to the plane of the deck 12 so that when the cover 17 of the valve body 16 is in the closed position, the cover 17 slopes downward towards the outlet side of the tray allowing liquid flowing across the tray to assist in lifting the valve. This is the natural wall shape when cut from a trapezoid aperture in the deck except that the wall would appear to lean forward and appear as a parallelogram shape from the side rather than a rectangle. The top left corner of the wall would be obtuse and the top right corner would be acute. A seated valve would slope downward towards the outlet side of the tray. This would make it so that liquid moving past the valve would tend to lift the valve open by impinging on the surface of the valve cover that extends outside of the walls. This would also tend to lower the valve pressure drop.

As illustrated in FIG. 8, each wall 14 may be provided with one or more projections 21 of triangular shape in an upper edge to provide small points for the valve cover 17 to rest on to limit the chance of the valve body 16 becoming stuck to the tray in a sticky service. The resulting small contact areas are less susceptible to sticking of the valve body 16 in sticky conditions. Alternatively, the upper edge of a wall 14 may be castellated, sinusoidal, or made jagged to provide a multiplicity of projections.

Still further, at least one of the cover 17 and the legs 18 of the valve body 16 may be provided with one or more holes 22 (see FIG. 2), slits or tabs in order to balance the weighting, reduce the weighting, promote flow from the deck 12 and/or to provide vapor momentum to further direct the liquid on the tray deck 12. Placing holes 22 in the cover 17 serves to promote froth and lighten the valve body 16 to increase easier lift.

In order to minimize wearing and erosion on the valve body legs 18 and the sides of the apertures 15 inwardly directed valve leg flanges may formed on the legs 18 to provide edges in surface contact with rounded surfaces of the walls 14.

The invention may be applied to valves wherein the valve has three walls matched with three legs that depend from a valve body, for example of round shape or triangular shape or hexagonal shape or other polygonal shape.

The invention thus provides an infusion valve for a contact tray that is of simple construction and that provides an elevated orifice for the passage of an ascending flow of vapor. In addition, the valve is able to more precisely control the blocking of the liquid flow on the upstream end of the valves.

The invention further provides a valve that can infuse vapor into a liquid on a tray deck to promote bubbling on the inlet of the tray.

The invention also provides a valve that improves the efficiency of contacting an ascending vapor with a liquid in a distillation column and improves the capacity of a contract tray by lowering the pressure drop.

What is claimed is:

1. A valve comprising
    at least one pair of upstanding walls having an aperture therebetween for an ascending flow of vapor; and
    a valve body having a cover spaced above said walls and at least a pair of legs extending from said cover through said aperture and in alternating relation with said walls.

2. A valve as set forth in claim 1 wherein said walls are in parallel to each other and said aperture is rectangular in shape and wherein said cover is of rectangular shape and said legs extend from opposite ends of said cover.

3. A valve as set forth in claim 2 wherein said cover is of a length less than each said wall.

4. A valve as set forth in claim 1 wherein said walls are opposed to each other and said aperture is trapezoidal in shape and wherein said cover is of trapezoidal shape and said legs extend from opposite ends of said cover.

5. A valve as set forth in claim 4 wherein said trapezoidal aperture has a long base thereof disposed on an upstream side relative to the flow of liquid and a short base thereof disposed on a downstream side relative to the flow of liquid.

6. A valve as set forth in claim 1 wherein said valve body is movable relative to said walls and has an upstream leg of said pair of legs disposed in interfitting relation with said walls at said upstream side and a downstream leg of said pair of legs disposed in laterally spaced relation to said walls at said downstream side.

7. A valve as set forth in claim 1 wherein each said wall has an upper edge disposed at an angle to the plane of said deck.

8. A valve as set forth in claim 1 wherein each said wall has at least one projection on an upper edge thereof for seating of said cover of said valve body thereon.

9. A valve as set forth in claim 1 wherein at least one of said cover and said legs of said valve have at least one opening therein.

10. A valve as set forth in claim 1 wherein said cover is bent downwardly at opposite sides to deflect the ascending flow of vapor.

11. A contact tray comprising
    a deck for receiving a flow of liquid thereon, said deck having an aperture for an ascending flow of vapor and at least one pair of walls extending upwardly therefrom adjacent said aperture; and
    a valve body disposed in said aperture for movement from a closed position on said walls to a raised position above said walls under the influence of the ascending flow of vapor through said aperture, said valve body having a cover for resting on said walls in said closed position and at least a pair of legs extending from said cover through said aperture, each said leg having a foot at a lower end for abutting an underside of said deck in said raised position.

12. A contact tray as set forth in claim 11 wherein said cover is of rectangular shape.

13. A contact tray as set forth in claim 11 wherein said cover is of trapezoidal shape.

14. A contact tray as set forth in claim 11 wherein said cover is of a length less than each said wall.

15. A contact tray as set forth in claim 11 wherein each said wall is integral with said deck.

16. A contact tray as set forth in claim 11 wherein each said wall is of a height equal to one-half the width of said aperture.

17. A contact tray as set forth in claim 16 wherein each said leg is of a height twice the height of a respective wall.

18. A contact tray as set forth in claim 11 wherein said valve body is of one-piece construction.

19. A contact tray as set forth in claim 11 wherein said aperture is trapezoidal in shape with a long base thereof disposed on an upstream side relative to the flow of liquid and a short base thereof disposed on a downstream side relative to the flow of liquid.

20. A valve as set forth in claim 11 wherein said cover is bent downwardly at opposite sides to deflect the ascending flow of vapor from said aperture into the liquid on said deck.

21. A contact tray comprising
    a deck for receiving a flow of liquid thereon, said deck having a plurality of pairs of opposed walls extending upwardly therefrom, each said pair of walls having an aperture therebetween for an ascending flow of vapor; and
    a plurality of valve bodies, each said valve body being disposed in a respective one of said apertures for movement from a closed position on a respective pair of said walls to a raised position above said respective pair of said walls under the influence of the ascending flow of vapor, each said valve body having a cover for resting on said respective pair of walls in said closed position and a pair of legs extending from said cover through said respective aperture, each said leg having a foot at a lower end for abutting an underside of said deck in said raised position.

22. A contact tray as set forth in claim 21 wherein said pairs of walls of disposed in rows with adjacent rows being disposed in staggered array.

23. A contact tray as set forth in claim 21 wherein each said pair of walls is disposed transverse to the flow of liquid on said deck.

24. A contact tray as set forth in claim 21 wherein each said pair of walls is disposed parallel to the flow of liquid on said deck.

* * * * *